Oct. 22, 1940.    M. S. MERRILL ET AL    2,219,191
PRESS FOR AUTOMOTIVE VEHICLE HOUSINGS AND ASSOCIATED PARTS
Filed April 10, 1939    3 Sheets-Sheet 1
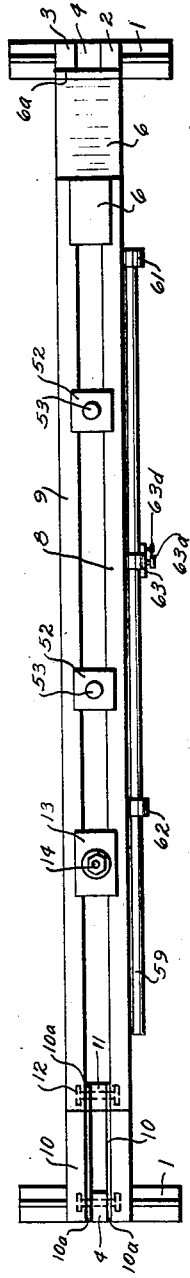
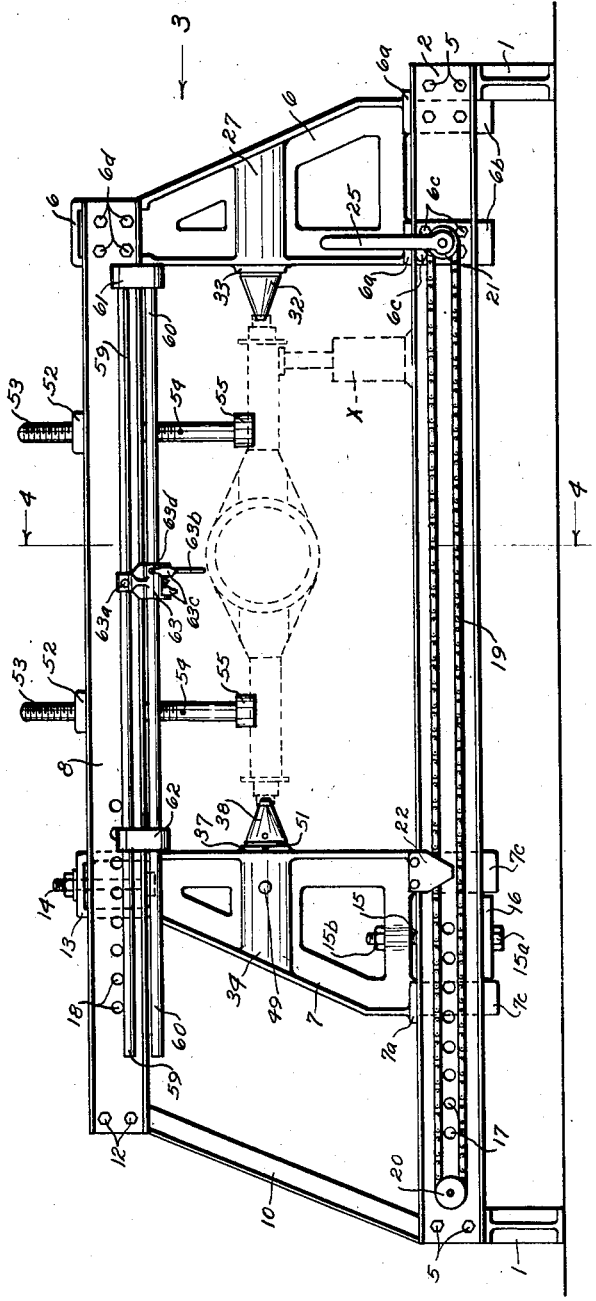
Inventors
Marcellus S. Merrill and
Lawrence W. Alfred.
By Whitehead & Vogl
Per Earle Whitehead
Attorneys

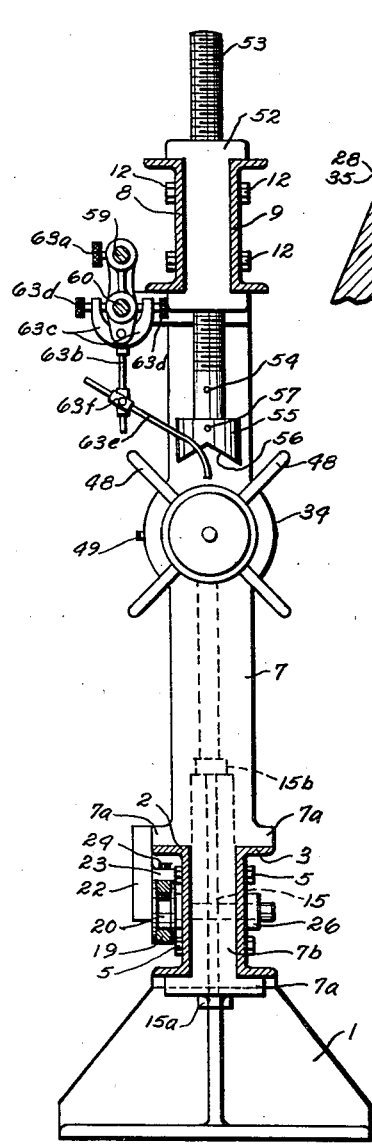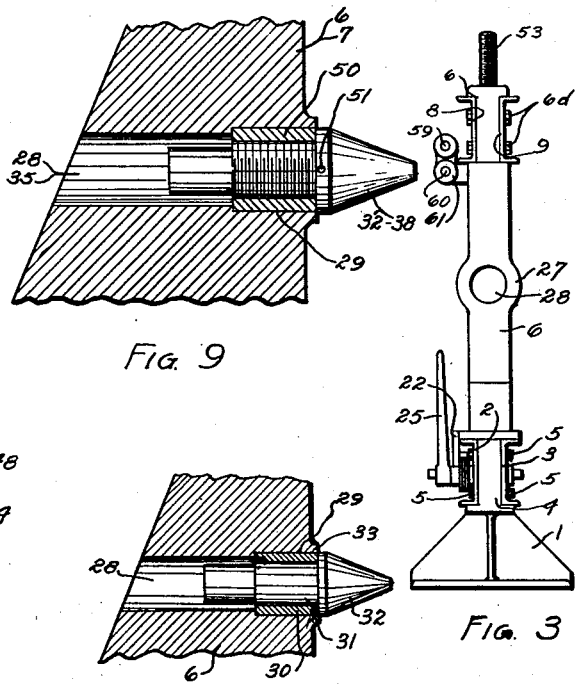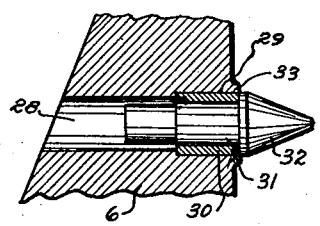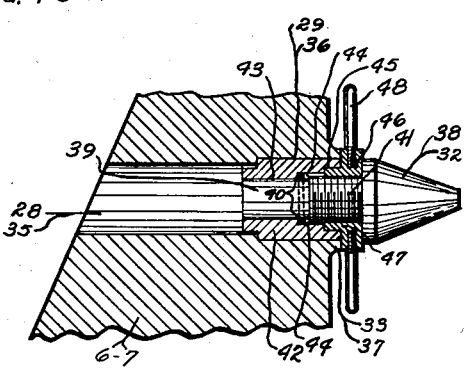

Patented Oct. 22, 1940

2,219,191

UNITED STATES PATENT OFFICE 2,219,191

PRESS FOR AUTOMOTIVE VEHICLE HOUSINGS AND ASSOCIATED PARTS

Marcellus S. Merrill and Lawrence W. Alfred, Denver, Colo.

Application April 10, 1939, Serial No. 267,198

8 Claims. (Cl. 153—48)

This invention relates to housing presses, namely, mechanisms principally designed for holding distorted rear housings of automotive vehicles for pressing the same into normal shape.

Objects of the invention are to provide a housing press (a) having convenient adjustability to various sizes and shapes of housings and to housings having various kinds and degrees of distortion; (b) of ample strength, rigidity and durability, under heavy duty, combined with a wide range of conveniently accomplished adjustability; (c) having facilities combined with the press for accomplishing operations other than normalizing the housing, but which operations are generally required to be done whenever a housing requires to be pressed into normal shape; (d) which is self-contained, requiring no special installation, and therefore of great convenience and utility; and (e) having improved means for accurately gaging the work done and to be done by the mechanism.

With these and other objects in view, all of which will more fully hereinafter appear, our invention comprises certain novel constructions, combinations and arrangements of parts, as will be hereinafter fully described and claimed, and as illustrated in the accompanying drawings in which Fig. 1 is a side elevation of the press, a housing and jack, in operative position, being indicated in broken lines.

Fig. 2 is a top plan of the same.

Fig. 3 is an end view of Fig. 1 looking in the direction indicated by arrow 3.

Fig. 4 is a section on line 4—4 of Fig. 1.

Fig. 5 is a fragmentary section illustrating the preferred construction of an adjusting spindle, with mounting therefor and associated parts.

Fig. 6 is a fragment, on an enlarged scale, of an elevation of one of the abutments, illustrating its modification for use in gaging and straightening bars, shafts, and the like.

Fig. 9 is a fragmentary section illustrating a simplified adjusting spindle structure.

Fig. 10 is a fragmentary section illustrating the non-adjusting, freely rotatable spindle, here illustrated as mounted in the fixed abutment.

Figure 6:
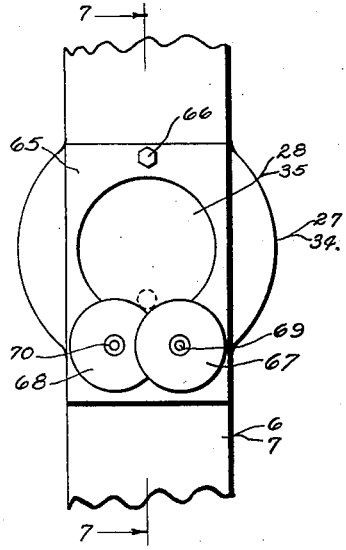

It should be remembered that the straightening of housings involves pressures up to 40,000 pounds, or even higher, and a housing press must be constructed to hold a housing in the required position while such pressures are being exerted thereon. Also, the most accurate gaging is required in such work, and certain operations other than pressing and gaging housings, are generally required to be done whenever a housing must be pressed, and the work as a whole is greatly facilitated if these needs can be met in a single structure primarily adapted to the pressing of a housing but which is also adapted to perform the other duties with, at most, the addition of certain attachments which the housing press, as such, is adapted to receive.

To these ends, on any suitable bases 1, we mount a track comprising opposed channel irons 2 and 3, spaced at each end by spacers 4, preferably formed integrally with bases 1 and secured by bolts 5, this track being hereinafter designated as "track 2—3." In this track we mount two abutments 6 and 7. Abutment 6 is seated in track 2—3 by means of footings 6a, and depending skirt plates having flanges 6b engaging the under side of the track, the skirt plates being secured in the track by bolts 6c.

Abutment 7 is slidably secured in the track by means of footings 7a and depending skirt plates 7b having flanges 7c engaging the underside of track 2—3. Above track 2—3 and parallel thereto is another track comprising opposed channel irons 8 and 9, and hereinafter referred to as "track 8—9," seated, at one end, in the sides of the top portion of abutment 6 and bolted thereto as at 6d, and at the other end spaced and secured to supporting brace 10, composed of two angle irons whose webs 10a lie on the inner sides of channels 8 and 9, a spaced 11 being provided between said webs and the assembly being secured by bolts 12.

The top of abutment 7 has a sliding fit in track 8—9, being flanged over the top of the track, as at 13, and provided with the bolt 14 engaging the web of the abutment in any suitable manner, not shown, to lock the abutment to the track, all as indicated at Figs. 1 and 2 but not shown in detail, as various suitable constructions permitting the abutment to slide in the track and to be locked thereto will answer and will readily occur to those skilled in the art, or in fact, to any competent engineer or mechanic.

Abutment 7 may be locked to track 2—3 in any suitable manner, as by bolt 15 having head 15a seated against plate 16, which in turn is seated on the under side of the track and having a nut 15b seated in the web of the abutment, which web may be suitably enlarged for the purpose.

For additional locking strength to withstand extra heavy pressures, holes 17 and 18 are provided in tracks 2—3 and 8—9, respectively, through which holes bars or pins may be inserted back of abutment 7. These holes may also be used in this manner for quickly blocking abutment 7 without tightening the nuts on bolts 14 and 15.

Abutment 7 is moved along track 2—3 in either direction by chain 19, which runs over idler sprocket 20 and ratchet sprocket 21, and is attached to abutment 7 by means of plate 22, bolted to and depending from one of the footings 7a, plate 22 carrying a lug 23 attached to a link in chain 19 in any suitable manner, conventionally indicated by a bolt head 24. Chain 19 may be operated in either direction by suitable means, as a ratchet wrench conventionally indicated at 25. Sprockets 20 and 21 may be mounted in the channel 2 in any suitable manner, as the shafts extending through the track and provided with nuts seated in channel 3, the shaft and nut for idler sprocket 20 being indicated at 26.

At a height sufficient to accommodate a jack therebeneath for operation as hereinafter described, abutment 6 is formed into a spindle housing 27, suitably bored at 28 and counterbored as at 29, to receive a bearing sleeve in which the shank 31 of freely rotatable spindle 32 is seated. A rim 33 surrounds the end of counter-bore 29 and serves as a seat, as later described. It will be understood that the shank 31 may be enlarged to rotatably fit the counter-bore 29 without the sleeve 30 if desired.

Abutment 7 has a spindle housing 34, a bore 35, counter-bore 36, and rim 37, all the same as, and in axial alignment, respectively, with the housing 27, bore 28, counter-bore 29 and rim 33, so that the various parts, attachments and operations herein described as associated with the housing, bore, counter-bore and rim of one abutment may be associated with and performed in association with either or both abutments, and in fragmentary views, Figs. 5, 6, 7, 9, and 10, these corresponding parts are accordingly given both indicating numerals. The description herein will be given in terms of one of the abutments, for simplicity and because in practice, it will generally be found convenient to associate the parts, attachments and operations with one of the abutments as described.

An adjusting spindle structure is illustrated at Fig. 5, where the spindle 38 has a shank 39, a dowel pin 40, and an enlarged threaded portion 41. Sleeve 42 fits into counter-bores 29 or 36, and has a bore 43, grooves 44 and counter-bore 45. Shank 39 bears slidably in bore 43. The ends of dowel pin 40 sit in grooves 44 and prevent rotation of shank 39 and its spindle 38 relative to sleeve 42, but permit longitudinal movement of the shank in the sleeve. Adjusting nut 46 is revolubly seated in counter-bore 45 by means of sleeve 47 and bears against rim 33, 37, and is interiorly threaded on the parts 41 of the spindle shank. The nut is provided with suitable means, as handles 48, threaded into the nut as shown, for rotating the nut and thus advancing or retracting the spindle to fit the work inserted between the spindles in the two abutments, as later described. Sleeve 42 is held against rotation by suitable means, as set screw 49.

At Fig. 9 a modified form of adjusting spindle is illustrated, wherein an interiorly threaded sleeve 50 fits in counter-bore 29, designated as 36 when referred to in the other abutment, and is held against rotation by set screw 49, (see Figs. 1 and 4) spindle 38 being adapted to be rotated by threaded holes 51 adapted to receive handles such as 48.

At Fig. 1 a rear housing of an automotive vehicle is indicated in broken lines as mounted upon and between spindles 32 and 38, and it will be obvious that any tubular structure may be thus mounted, spindle 38 being brought substantially to the desired point by movement of abutment 7 by ratchet wrench 25, the final adjustment of spindle 38 being made by rotating the spindle by means of handles 48 within the threaded sleeve to project or retract the spindle as above described.

A housing mounted on the spindles as above described will be directly above and parallel with the track 2—3, so that a jack X, indicated in broken lines at Fig. 1, may be seated on track 2—3 beneath the point at which upward pressure is desired to be exerted upon the housing.

To hold the work at the desired points, channeled adjusting nuts 52 are slidably mounted in track 8—9, and adjusting screws 53 are threaded into the nuts and are provided with suitable means, as holes 54, to receive a pin or other suitable rotating implement not shown, to raise or lower the screws in nuts 52, the screws 53 being provided on their lower ends, with rotatable heads 55, notched or grooved as at 56 and provided with means, as holes 57, to receive a rotating implement whereby heads 55 may be rotated to align grooves 56 to fit any work mounted between abutments 6 and 7, the heads 55 being lowered to contact the work by rotation of screws 53.

To gage the work, we provide gage bars 59 and 60 affixed to abutment 6 by suitable means, as twin socket 61, and slidingly supported by abutment 7 by means of twin collars 62 carried by abutment 7 and slidingly engaging bars 59 and 60. Gage assembly 63 is slidably collared on bars 59 and 60, and may be locked at any point along the bars by set screw 63a and carries a depending bar 63b, adapted by suitable means, as arm 63c and set screws 63d, to be set vertically as illustrated at Fig. 4, or at an angle to such vertical position, either forward or backward thereof, further details being omitted, as the type of construction will be understood by those skilled in the art. Gage finger 63e is connected with bar 63b by a pair of sleeves pivotally interconnected and slidable upon and lockable to the bar and finger, all conventionally indicated at 63f, whereby the point of finger 63e can be adjusted to any point desired relative to the work supported between the abutments 6 and 7.

Provision is made in the gage assembly 63, the details of construction not being involved in the present invention, for swinging bar 63b with finger 63e forward or backward from any position set in gaging the work in order to withdraw these parts from proximity to the housing and avoid interference with the work, but bar 63b and finger 63e maintain their interrelative positions so that when they are swung back to gaging position the point of finger 63e will automatically reassume the position relative to the housing to which it was first set.

It will be understood that any desired gaging implements or points may be carried by finger 63e for most accurately gaging the housing or other work. And it will be understood that bars 59 and 60 should be mounted on the abutments so that any springing or separating as between abutment 7 and track 8—9, resulting from the heavy pressures exerted, will leave the gaging assembly undisturbed in its relation to the work.

The operation of straightening a distorted housing with the apparatus thus described will be readily understood and requires little description. A freely rotatable spindle is mounted on abutment 6 and adjusting spindle in abutment 7. The housing is placed between the spindles, abutment 7 being drawn to the approximate position desired by the operation of chain 19, spindle 38 then being advanced by rotation until the points of both spindles engage the ends of the housing and support the housing as illustrated at Fig. 1. The housing may then be rotated on the spindles until the bend in or distorted portion of the housing is brought in the proper position to be straightened by upward pressure on some portion of the housing, whereupon a jack is seated upon the track 2—3 beneath the point where the upward pressure is to be applied and the adjusting nuts 52 are slid in track 8—9 to position directly above effective points at which a hold the housing in opposition to the upward pressure to be exerted by the jack. Adjusting screws 53 are then screwed down and heads 55 rotated until the grooved heads 55 snugly engage the housing at the desired points, whereupon the jack is operated to exert the upward pressure upon the housing at the desired point to force the housing upwardly at that point and into normal position.

It will be understood that track 8—9 is anchored to track 2—3 by abutments 6 and 7 by means of the construction above described. During the pressing operation above described, abutment 7 is not locked to the tracks by the bolts 14 and 15. The engagement of abutment 7 and its various associated parts with the tracks 2—3 and 8—9, plus the normal resistance of chain 19, will hold abutment 7 in its adjusted position under all ordinary conditions, and when the housing straightens out under the heavy pressures exerted upon it, the housing will lengthen slightly, and in so doing will slide abutment 7 in the tracks sufficiently to allow for such lengthening of the housing. In other words, abutment 7 will give way, by sliding as above described, sufficiently to permit the housing to straighten.

The circular differential casing in the center of any housing has a large number of bolt holes in its faces, and if the distortion of the housing is of such nature that its straightening will tend to distort the casing, any heavy metal plate, with holes corresponding to those in the faces of the casing, may be bolted to the casing faces to brace the casing against such distortion.

The work and the progress thereof is gaged as desired by the gage 63 above described.

Figure 7:
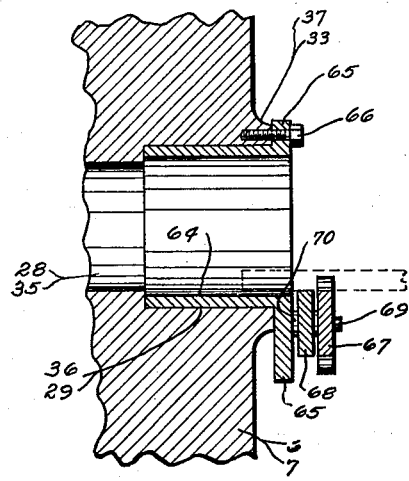
Fig. 7 is a section on line 7—7 of Fig. 6.

At Figs. 6 and 7 we have illustrated a modification or adaptation of the structure for gaging and straightening shafts, bars, and the like. For these purposes, in place of sleeves and spindles and associated parts as above described and illustrated at Figs. 1, 4, 5, 9 and 10, the structure is adapted to receive in counter-bores 29 and 36 sleeves 64 having flanges 65 which seat against rims 33 and 37 and are secured thereto by suitable means, as cap screws 66. A pair of overlapping idler rollers 67 and 68 is mounted in the lower part of each flange 65, the rollers being mounted on pins 69 and 70 for independent rotation, and being so overlapped that a curve-sided V is formed by the intersection of the lines of the upper portions of their peripheries at such a point that a bar or shaft, shown in broken lines, seated in said V, may project into the counter-bores 29 and 36. A bar or shaft seated in the two pairs of idler rollers, as above described, will be in substantially the same position as the housing indicated in Fig. 1 and may be gaged and pressed in substantially the same manner as above described for gaging and pressing the housing. When the housing of an automotive vehicle requires straightening, the drive shaft also generally requires straightening or at least gaging, and accordingly the efficiency of the housing press is increased by making it adaptable also for shaft gaging and straightening.

In Fig. 1 the housing, indicated in broken lines, is a housing of the full-floating-axle type. Such housings have sleeves projecting from the housing, and these sleeves carry, on their outer ends, the bearings for the wheels for the vehicle. In connection with the straightening of such housings it is usually necessary to remove the sleeves, but as the sleeves fit very tightly in the housing, a heavy pressure is required to remove the sleeves from the housing. The use of the present invention for the removal of a sleeve from such a housing is illustrated at Fig. 8, where the rim 71 of a housing 72 is illustrated as seated against rim 37, the bearing end 73 of sleeve 74 projecting into the bore 35, the housing being supported in any suitable manner, conventionally indicated in broken lines, as a box seated on track 2—3 beneath the differential casing.

Figure 8:
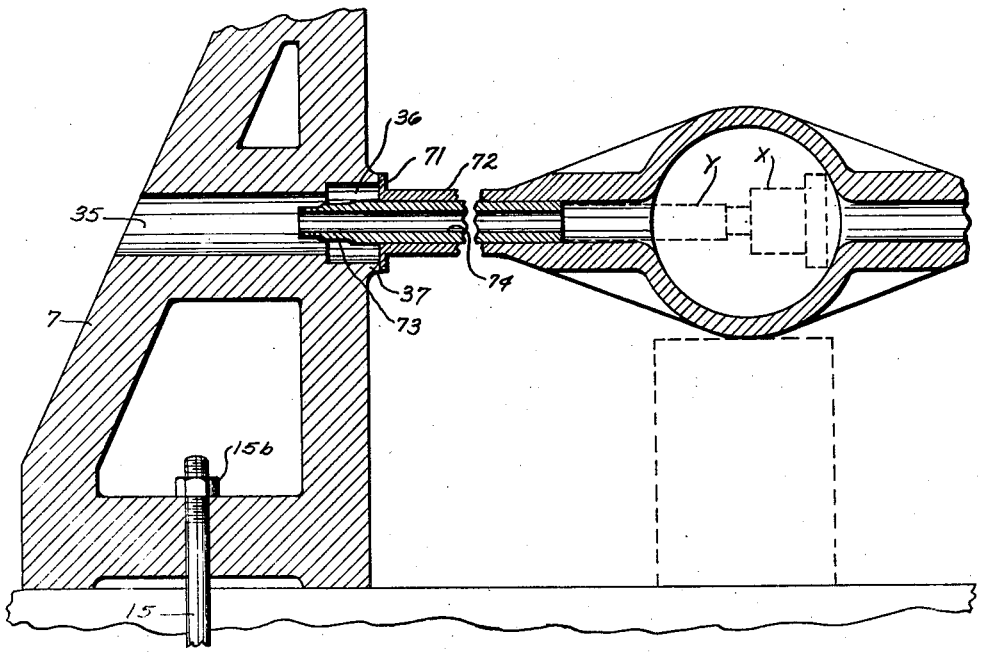
Fig. 8 is a fragmentary section illustrating the use of the press to remove a sleeve from full-floating axle type of housing.

It will be understood that the opposite end of the housing not shown at Fig. 8, may engage spindle 32 on abutment 6, as illustrated at Fig. 1. A jack X is indicated in broken lines within the differential casing at Fig. 8, being seated against the inner surface of the casing and having a bar Y projecting into the housing to contact the rear or inner end of sleeve 74, whereby, when the jack is operated, bar Y will eject sleeve 74 into bore 35. In this operation, abutment 7 is locked in the tracks by bolts 14 and 15, usually also by bars or pins inserted through holes 17 and 18 in the tracks.

It will be obvious that, if desired, the jack X may be seated against rim 33 of abutment 6, and in such case the bar Y will be long enough to extend from the jack thus seated, through that portion of the housing which is broken away at Fig. 8, across the casing and to the rear end of sleeve 74, which will in such case, be contacted and ejected by the longer bar Y the same as by the operation illustrated at Fig. 8.

In the sleeve ejecting operation as illustrated at Fig. 8, an adjusting spindle of the type illustrated at Figs. 5 and 9 may be mounted in abutment 6 for pressing the housing firmly against rim 37 of abutment 7 when that abutment is locked to the tracks. The operation may be reversed, mounting the adjusting spindle in abutment 7 and ejecting the sleeve 74 into bore 28 in abutment 6.

The housing indicated in Fig. 1 is mounted on spindles 32 and 38 by means of the sleeve 74, and it will be understood that housings of other types not having such sleeves, will directly engage the spindles, such housings being the equivalent, so far as concerns pressing operations to be performed with the present invention, of the housing 72 illustrated at Fig. 8.

We have herein described the jack X as seated against track 2—3 and the work-holding assemblies 52—53—54—55 as seated in track 8—9. Obviously this arrangement may be reversed without change in the principle or material change in the details of structure or operation.

We have herein described, and illustrated in the drawings, many other details of construction and operation, but various constructions and operations, differing in detail, will occur to those skilled in the art as equivalent or obvious alternatives of those illustrated and/or described, and we do not wish to be confined to the details of construction or operation illustrated or described.

We claim:

1. In an apparatus of the class described, a base track and a secondary track interrelatively aligned and spaced apart but rigidly interconnected, two abutments in interrelative opposition between said tracks, one of said abutments being slidable in, and longitudinally of, said tracks, means mounted in said abutments for supporting a housing between said abutments spaced from both tracks, one track being adapted for seating a jack thereagainst and between said track and a housing thus supported between the abutments, means slidably seated in the opposite track adapted to engage a housing thus supported and to hold such housing during and in opposition to the exertion of pressure upon such housing by a jack thus seated.

2. In apparatus as defined in claim 1, means for moving a slidable abutment longitudinally along the tracks comprising a belt-like member looped around pulley-like members rotatably mounted on one of the tracks, the belt-like member being attached to said slidable abutment and means to rotate one of the pulley-like members to move the belt-like member and said abutment.

3. In apparatus as defined in claim 1, housing supporting means comprising spindles mounted in the abutments and having interrelatively opposed points adapted for insertion into the opposite ends of a housing, whereby to support such housing upon said spindles.

4. In apparatus as defined in claim 1, housing supporting means comprising spindles rotatively mounted in the abutments and having interrelatively opposed points adapted for insertion into the opposite ends of a housing whereby to support such housing upon said spindles.

5. In apparatus as defined in claim 1, the housing supporting means comprising spindles mounted in the abutments and having interrelatively opposed points adapted for insertion into the opposite ends of the housing whereby to support such housing upon said spindles, one of said spindles being threaded into a sleeve mounted in the abutment and means for causing interrelative rotation as between said spindle and sleeve whereby to project or retract said spindle relative to the abutment.

6. In apparatus as defined in claim 1, members carried by said abutments, slidable as to one abutment, parallel with the axis of the spindles and gaging means supported by said members and slidable longitudinally thereof.

7. In apparatus as defined in claim 1, said slidable engaging means comprising nuts slidable longitudinally of the track in which they are seated, pins threaded through said nuts and carrying notched heads rotatable on said pins.

8. In apparatus as defined in claim 1, housing supporting means including axially aligned counter-bored bores in the abutments, spindles adapted to be mounted within said bores and removable therefrom and sleeves interchangeable with said spindles in said bores and having flanges adapted to seat against the opposed faces of the abutments, said flanges carrying pairs of overlapping idler rollers whereby to rollingly support a shaft upon said pairs of idler rollers with the ends of the shaft projecting into said bores and the shaft in position for engagement by and between said slidable engaging means and a jack seated on the opposite track.

MARCELLUS S. MERRILL.
LAWRENCE W. ALFRED.